April 25, 1961   E. S. CANDIDUS   2,981,823
PRODUCTION OF METALS
Filed May 5, 1958
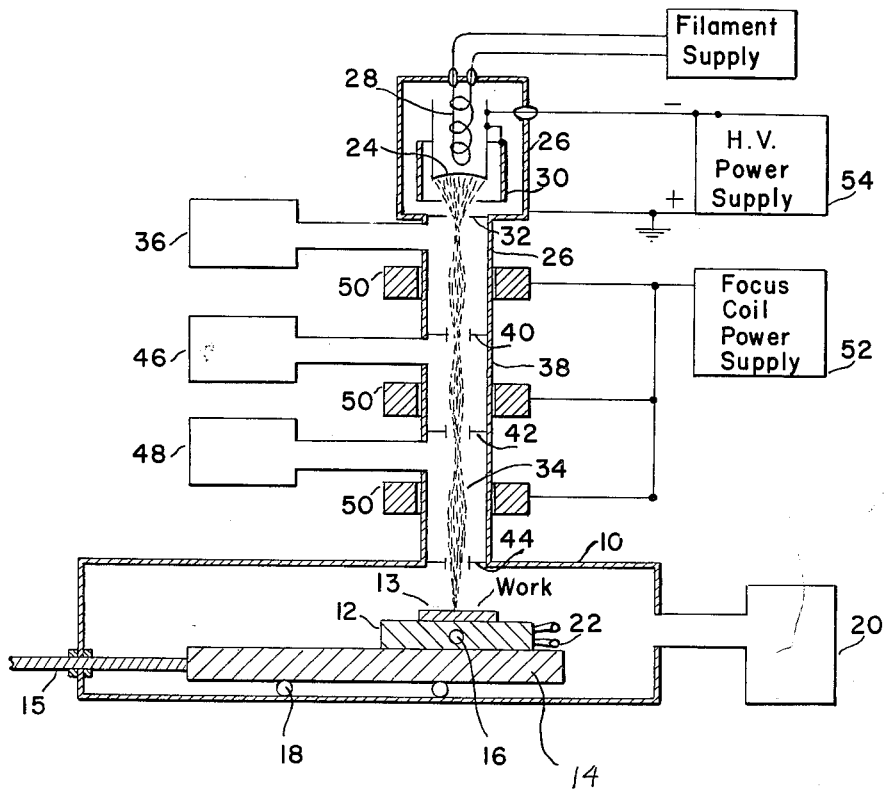
INVENTOR.
Edward S. Candidus
BY
Oliver W. Hayes

United States Patent Office 2,981,823
Patented Apr. 25, 1961

2,981,823

PRODUCTION OF METALS

Edward S. Candidus, Boston, Mass., assignor to National Research Corporation, Cambridge, Mass., a corporation of Massachusetts Filed May 5, 1958, Ser. No. 733,028

4 Claims. (Cl. 219—117)

This invention relates to the welding of reactive metals under vacuum, and particularly to a device for welding such reactive metals which contain gases and other volatiles to produce sound welds.

A principal object of the present invention is to provide a welding device for welding refractory and reactive metals under vacuum to produce gas-free welds of extreme purity.

Another object of the invention is to provide a welding device of the above type which is capable of producing extremely intense heating in a very localized spot.

Still another object of the invention is to provide a welding device of the above type which provides excellent control of the welding rate to insure the formation of an excellent weld.

Still another object of the invention is to provide a welding device of the above type which permits a relatively high rate of welding with the requisite high vacuum.

These and other objects of the invention will in part be obvious and will in part appear hereinafter.

The invention accordingly comprises the apparatus possessing the construction, combination or elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing which is a diagrammatic, schematic, sectional view of a preferred embodiment of the invention.

In the present invention electron bombardment of the metal work pieces is employed for melting the metal to be welded under high vacuum to produce a pure, sound weld. In the vacuum welding of reactive metals such as titanium, zirconium, uranium, molybdenum and the like, it is not essential that the absolute pressure be lower than about 1 to 10 microns Hg abs. to obtain a sound weld. However, during the welding the melted metal will be heated sufficiently to drive out dissolved and combined gases and volatilize metallic and other impurities contained in the metal. In the micron range of pressures the oxides and nitrides of many metals are either volatile or unstable at the melting point of the metal. Operating an arc welding furnace at such pressures is extremely difficult unless the arc is between a consumable electrode and liquid metal at the weld. The very nature of the consumable electrode welding operation, however, makes it extremely difficult to control the melting rate.

While there have been suggestions in the art of small scale welding of metals by electron bombardment of the metal to be welded, this has not been very practical because of the fact that the source of electrons must be maintained at an extremely high vacuum, on the order of a few hundredths of a micron absolute pressure. This means that all of the gas or other volatiles liberated from the metal must be pumped out of the system at this extremely high vacuum. This requires large, expensive high vacuum diffusion pumps. Since the number of diffusion pumps that can be attached to a given welding furnace is limited by the size of the furnace, and since any diffusion pump has only a definite maximum capacity, the welding rate is limited to the available pumping capacity. This has drastically limited the utility of electron welding to small scale laboratory equipment or to larger systems with expensive, extremely high pumping capacities.

The present invention can best be understood by reference to the drawing which is a diagrammatic, schematic sectional view of one preferred embodiment of the invention. The welding furnace includes a vacuum tight chamber 10 having a work support 12 which supports a work piece 13 to be welded. The work support means 12 is carried by a carriage 14 which is arranged to be moved laterally by means of a screw drive schematically indicated at 15. Work support 12 is moved normal to the movement of carriage 14 by means of a second screw means schematically indicated at 16. Bearings 18 provide rolling support for carriage 14. The welding furnace chamber is provided with a high capacity vacuum pump 20, such as a mechanical blower or diffusion pump which can handle large volumes of gases in the 1 to 10 micron pressure range. While this is not a high vacuum, in the true sense of the word, it is a sufficiently high vacuum to permit formation of pure sound welds in most metals, such as titanium, zirconium, tantalum, niobium and the like. It will also permit dissociation or volatilization of many oxides and nitrides particularly of the group V and group VI metals. At 22 there is shown a pair of cooling pipes 22 which provide cooling water for work support 12, thus limiting the melting of the work piece to the portion to be welded.

A cathode 24 for emitting electrons is positioned in a cathode chamber 26 communicating with the furnace chamber 10. This cathode 24 is preferably a concave tantalum or tungsten element and is arranged to be heated by a heater element 28. The cathode 24 has a focusing electrode 30 which, in combination with an accelerating anode 32 provides a high energy, focused beam 34 of electrons. In one preferred embodiment of the invention, the cathode 24 is at 20,000 volts negative with respect to the accelerating anode 32 which is at ground potential. The cathode chamber 26 is provided with a high vacuum pump 36 which maintains the cathode chamber at a pressure on the order of 0.01 micron Hg abs. The cathode chamber is isolated from the furnace chamber by a tube 38 containing several apertured partitions 40, 42 and 44 through which the focused electron beam 34 is directed into the furnace chamber and onto the surface of the molten pool in the cold mold. Each aperture is preferably in the form of a cylinder which is coaxial with the electron beam and is slightly larger than the focused beam 34 of electrons to permit passage of the electron beam therethrough but to inhibit, as much as possible, the flow of gas from the furnace chamber 10 to the cathode chamber 26.

In one embodiment of the invention illustrated, there are three such apertures and three pumps. The first pump 36 provides for the maintenance of a very high vacuum (e.g. $1 \times 10^{-5}$ mm. Hg abs.) in the cathode chamber 26. The second pump 46 maintains a pressure of about 0.1 micron ($1 \times 10^{-4}$ mm. Hg abs.) in the space between the partitions 40 and 42, while the third pump 48 maintains a pressure of about 1 micron between the partitions 42 and 44. The welding furnace chamber 10 is connected to the booster pump 16 which will maintain the pressure in 10 between 1 and 10 microns.

In addition to the elements enumerated above, the apparatus includes a plurality of focusing coils for keeping the electron beam focused in a narrow beam for passage through the restricted openings in the partitions 40, 42 and 44. This focusing means provides an electron beam of accurately controllable cross section for heating the work piece at the exact spot desired. By adjustment of the beam focus, the weld can be made narrow or wide as desired by the operator. A suitable power supply 52 is provided for the focusing coils. A high voltage power supply 54 is connected to the elements of the electron emitter 24 and beam forming anode 32.

The present invention permits the melting of the metal at the weld at any desired rate to permit purification of the melt to attain a sound weld. It also enables careful control of the size of the melt at the weld to achieve any desired depth or width of melting. This is true even though the system may be subjected to bursts of pressure due to volatilization of metal chlorides, for example, from metal being melted in the weld. The invention also has the advantage that it eliminates the possibility of dangerous short circuits by gas discharge in the high voltage portion of the apparatus, particularly when bursts of gas are given off at the weld. This has the effect of greatly simplifying the design of the electrical system and lowers the cost of the high voltage power supply. The present invention also permits use of rather delicate cathode surfaces having materials of high electron emission without danger of spoiling such surfaces due to pressure bursts in the welding furnace. In this case a valve is preferably placed in tube 38 so that the valve can be shut when work pieces are to be charged so as to maintain a high vacuum at all times in the vicinity of the cathode.

While one preferred embodiment of the invention has been described above, numerous modifications thereof can be made without departing from the scope of the invention. For example, more pumping chambers can be employed along the path of travel of the electron beam thereby decreasing the total volumetric capacity of the requisite pumps by increasing the number of such pumps. Similarly, the number of chambers can be decreased with increasing volumetric pumping requirements. Numerous other heating means and electron beam forming systems can be employed as well as other standard methods for handling work pieces to be welded.

The present invention, in addition to the advantages enumerated above, also permits the welding of irregularly-shaped articles with ease since the electron beam can be made to have very substantial depth of focus and the focal plane of the beam can be varied quite simply by electrical or magnetic means. Equally the welding can be carried out under a partial pressure of a treating gas where such is desirable.

Since certain changes may be made in the above apparatus without departing from the scope of the invention herein involved, it is intended that all matter contained in the above description or shown in the accompanying drawings be interpreted as illustrative and not in a limiting sense.

What is claimed is:

1. Apparatus for welding volatile-containing metals to produce gas-free, sound welds, said apparatus comprising a vacuum-tight furnace chamber, a cathode chamber, a work support in said furnace chamber, first vacuum pumping means for evacuating said furnace chamber to a free-air pressure on the order of one micron Hg abs., a cathode, means for heating said cathode to an elevated temperature to produce thermal emission of electrons therefrom, means for accelerating said electrons and forming said electrons into a beam, said cathode being in said cathode chamber which is isolated from said furnace chamber by a wall containing an aperture and focusing means arranged to direct said electron beam through said aperture onto a work piece held by the work support in the furnace chamber to maintain a pool of molten metal on the work piece at the location of the weld, means for moving the work piece so as to move the molten pool along the work piece, and a second vacuum pumping means associated with the cathode chamber having sufficient pumping capacity to avoid deterioration of said cathode, by maintaining said cathode at a pressure less than 0.1 micron Hg abs., despite gases leaking through the aperture when the furnace chamber is at a higher pressure than the cathode chamber.

2. The apparatus of claim 1 wherein a plurality of intermediate chambers and aligned apertures are provided between the source of electrons and the furnace chamber, having a plurality of vacuum pumping means associated with the chambers to evacuate the chambers.

3. Apparatus for welding gas-containing metals to produce gas-free welds, said apparatus comprising a vacuum-tight work chamber and a cathode chamber, means for evacuating said work chamber to a free-air pressure approximating one micron Hg abs., a cathode, means for heating said cathode to an elevated temperature to produce thermal emission of electrons therefrom, means for accelerating said electrons and forming said electrons into a beam, said cathode and a surrounding focusing electrode being in said cathode chamber which is isolated from said work chamber by a wall containing an orifice, said cathode and beam forming means being positioned to direct said electron beam through said orifice onto a work piece to be welded, a support for holding said work piece in a given plane, means for moving said support in one direction parallel to said plane and means for moving said work piece in another direction parallel to said plane, and vacuum pumping means associated with the cathode chamber having sufficient pumping capacity to protect the cathode by maintaining said cathode chamber at a pressure less than 0.1 micron Hg abs., despite gases leaking through the orifice when the work chamber is at a higher pressure than the cathode chamber.

4. The apparatus of claim 1 wherein said focusing means comprises a focusing coil which is positioned outside of the cathode chamber and is separated from said cathode chamber by a vacuum-tight wall.

References Cited in the file of this patent

UNITED STATES PATENTS

| 2,778,926 | Schneider | Jan. 22, 1957 |
| 2,793,282 | Steigerwald | May 21, 1957 |
| 2,883,544 | Robinson | Apr. 21, 1959 |
| 2,899,556 | Schaffer et al. | Aug. 11, 1959 |